US 6,571,190 B2

(12) United States Patent
Hou et al.

(10) Patent No.: US 6,571,190 B2
(45) Date of Patent: May 27, 2003

(54) AUTOMATIC CALIBRATION OF REMOTE HYDRAULIC VALVE FLOW

(75) Inventors: Yanming Hou, Racine, WI (US); Guy T. Stoever, Naperville, IL (US); David E. Susag, Fargo, ND (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/845,901

(22) Filed: Apr. 30, 2001

(65) Prior Publication Data

US 2002/0161541 A1 Oct. 31, 2002

(51) Int. Cl.$^7$ .......................... G01L 25/00; G06F 19/00
(52) U.S. Cl. ...................................................... 702/105
(58) Field of Search ........................ 702/105; 318/624; 180/333; 172/2

(56) References Cited

U.S. PATENT DOCUMENTS

| | | | | | |
|---|---|---|---|---|---|
| 5,748,097 A | * | 5/1998 | Collins | ..................... | 340/686.1 |
| 5,845,224 A | * | 12/1998 | McKee | ........................ | 701/51 |
| 5,853,076 A | * | 12/1998 | McKee et al. | ........... | 192/87.14 |
| 5,887,669 A | * | 3/1999 | Ostler et al. | ................. | 180/333 |
| 5,918,195 A | * | 6/1999 | Halgrimson et al. | ........ | 318/624 |
| 5,924,371 A | * | 7/1999 | Flamme et al. | .............. | 111/177 |
| 6,112,839 A | * | 9/2000 | Ostler et al. | .................... | 172/2 |
| 6,205,875 B1 | * | 3/2001 | Eike et al. | ..................... | 74/335 |
| 6,321,767 B1 | * | 11/2001 | Seid et al. | ............... | 137/15.21 |
| 2002/0162594 A1 | * | 11/2002 | Najmolhoda et al. | .. | 137/625.65 |

* cited by examiner

Primary Examiner—John Barlow
Assistant Examiner—Aditya Bhat
(74) Attorney, Agent, or Firm—A. N. Trausch; S. Michael Patton

(57) ABSTRACT

A computer calibration method and apparatus for calibrating one or more auxiliary hydraulic valves on a work vehicle includes the steps of selecting a first auxiliary hydraulic valve, applying a valve opening signal to that valve, measuring a pressure in a flow restricted signal circuit coupled to the valve, comparing the first pressure with a predetermined pressure to see if the valve is cracked open and if the valve is not cracked open, incrementing the signal to a second level and repeating the foregoing steps until the first valve cracks open. The final step is saving a value indicative of the signal at which the valve just cracked open.

10 Claims, 5 Drawing Sheets

AUTOMATIC CALIBRATION OF REMOTE HYDRAULIC VALVE FLOW

BACKGROUND OF THE INVENTION

The invention relates generally to work vehicles. More particularly, it relates to auxiliary hydraulic valves and controllers for work vehicles. Even more particularly, it relates to automated methods and structures for calibrating the auxiliary valves for such vehicles.

FIELD OF THE INVENTION

This invention provides a way for automatically calibrating electronically controlled remote hydraulic valves. It is adaptable for use on all agricultural and construction vehicles equipped with electronically controlled remote hydraulic valves.

Remote hydraulic valves provide auxiliary hydraulic flows to implements that are coupled to vehicles for performing various tasks. Typically, such a vehicle will have several such valves, typically varying between two and eight. These valves are controlled in an operator station typically in the cab of the vehicle, most commonly by manipulating a lever or knob that provides a signal proportional to the movement of the lever or knob and indicates a desired flow rate to or from an auxiliary hydraulic valve. The hydraulic valves are typically connected to a manifold or manifolds, most commonly located at the rear of the vehicle, to which hydraulic actuators are mounted. These hydraulic actuators include such things as hydraulic motors and cylinders. By varying the position of the lever or knob, the operator can vary the flow rate to the manifold, and thence to the hydraulic actuators located on the implement.

Another common user input device located at the operator station is a flow rate control. The flow rate control is typically a small dial or knob that is set by the operator and indicates a maximum flow rate through the valve. Thus, by rotating the flow rate control, the operator can limit the operating range of the lever or knob from a flow rate of zero (0) to a positive maximum flow rate indicated by the flow rate control, and a negative maximum flow rate, also indicated by the flow rate control.

Vehicle operators usually expect the same flow rate curve from all the auxiliary hydraulic valves. Flow variations between valves may be severe, however, due to the tolerances of the valves, the actuators and the controls.

A typical problem that is commonly found with auxiliary hydraulic valves is that of hysteresis. From the operator's perspective, hysteresis appears when the operator moves the lever or knob away from a zero flow rate position towards either a positive or negative flow rate and no flow passes through the valve.

The initial small movements of the lever or knob generate equivalent small electrical signals that are applied to the valve coil. These small initial signals are insufficient to overcome the valve's static friction and therefore these initial small movements of the lever or knob will not cause the valve to open.

As the operator continues to move the lever or knob, indicating a higher flow rate, and generating a larger valve signal, the valve will still remain closed until the applied signal is sufficient to overcome the static friction, at which point a low flow rate begins to pass through the valve.

In some cases, the valve spool may indeed move when a signal is applied, but due to the location of the various lands and grooves, this movement may not be sufficient to open up a fluid flow path. The effect, from the operator's perspective, is the same: movement of the lever or knob does not result in an equivalent flow rate.

In addition, a strong spring used in the valve may resist the movement of the spool and also result in no valve opening when small valve signals are applied.

During this movement of the lever or knob, the valve signal applied to the valve is indeed increasing. However, due to frictional effects in the valve, the resistance of the spring, or the location of the various lands and grooves, no hydraulic flow through the valve may occur. This region of no valve flow when the lever or knob is moved is often called a "dead-band."

A way to cancel out this dead-band is needed in order to make the whole range of motion of the lever or knob provide an proportional flow rate.

The dead-band can be modeled as a constant valve signal offset that must be added to any signal sent by the controller. If the valve resists opening until a small positive valve signal is applied, this offset should be added to any signal transmitted by the lever or knob. In this manner, whenever the operator moves the proportional controlled lever or knob, even a small amount, some flow will begin to pass through the valve.

Determining this offset for a particular valve in a particular vehicle, generally requires actually applying a signal to the valve until the valve just opens or "cracks". If one could observe the valve "cracking" and identify the actual signal that was applied to the valve at the same time, the signal could be saved in the valve controller for later addition to the signal received from the proportional control lever or knob.

Identifying the valve "cracking" point would normally require the attachment of a loop-back tool to each of the valves. When the valve cracks open, fluid will begin to flow through the valve, out through the quick-connect coupling, through the loop-back tool, back into the adjacent quick-connect coupling, back through the valve and then to a hydraulic reservoir or tank. This, however, would require that an additional tool be attached to the vehicle. During assembly of the vehicle, and when calibrating the vehicle in the field, it is awkward to use such a tool.

OBJECTS AND SUMMARY OF THE INVENTION

What is needed, therefore, is a method and apparatus for calibrating auxiliary hydraulic valves without the necessity of attaching a loop-back tool to the auxiliary hydraulic manifold. It is an object of this invention to provide such a method and apparatus.

It is also an object of this invention to provide a method and apparatus for sequentially and automatically calibrating each of the auxiliary hydraulic valves under computer control.

In accordance with the first embodiment of the invention, a method of computer calibrating at least one auxiliary hydraulic control valve is provided that includes the steps of selecting a first valve from a plurality of hydraulic control valves, applying a signal to that valve that is equivalent to a first degree of desired valve opening, measuring a first pressure in a restricted flow rate circuit, comparing the pressure with a predetermined pressure to identify a pressure change that indicates the cracking of the valve, incrementing the signal if the valve is not cracked and repeating the foregoing steps until the first valve cracks open, and finally saving a value indicative of the increment signal.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
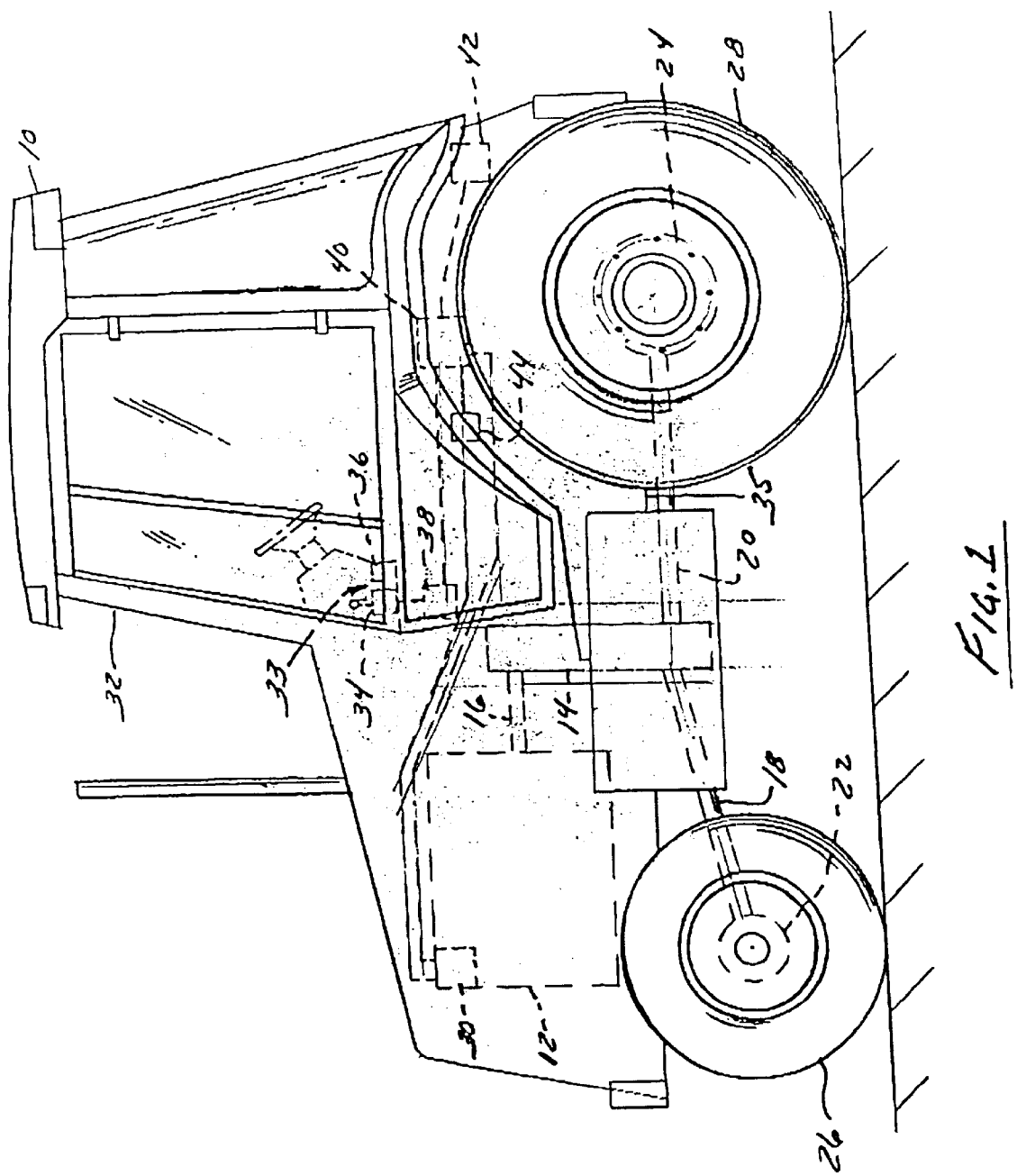
FIG. 1 illustrates a work vehicle, shown as a tractor, having an auxiliary hydraulic valve calibration system in accordance with the present invention.

Referring now to FIG. 1, a vehicle 10 is shown having an engine 12 drivingly engaged to a transmission 14 by a drive shaft 16. These are mounted on a chassis 35. The transmission 14 is in turn coupled through drive shafts 18 and 20 to front differential 22 and rear differential 24. Front wheels 26 are coupled to and driven by differential 22 and rear wheels 28 are coupled to and driven by differential 24. A hydraulic pump 30 is coupled to and driven by engine 12. This pump provides hydraulic fluid to the auxiliary valves.

Inside cab 32 is an operator station 33 that includes a proportional control lever 34 and a flow rate control 36. These controls are coupled to electronic controller 38 which receives the operator commands and converts the operator commands into valve signals which are applied to auxiliary hydraulic control valves 40. Valves 40 regulate the flow of fluid between pump 30 and auxiliary valve manifold 42 located at the rear of the vehicle. Manifold 42 typically includes quick-connect couplings that provide bi-directional flow to implements (not shown) that have mating hydraulic connectors.

A load sensing and control circuit 44 is fluidly coupled to valves 40 and pump 30. It receives fluidic signals from each of the auxiliary hydraulic valves and transmits a signal indicative of the hydraulic load on the valves to pump 30. Pump 30, in turn, varies its specific hydraulic output (i.e., the volume of hydraulic fluid per single revolution or cycle of pump 30) in accordance with the load signal that it receives.

Figure 2:
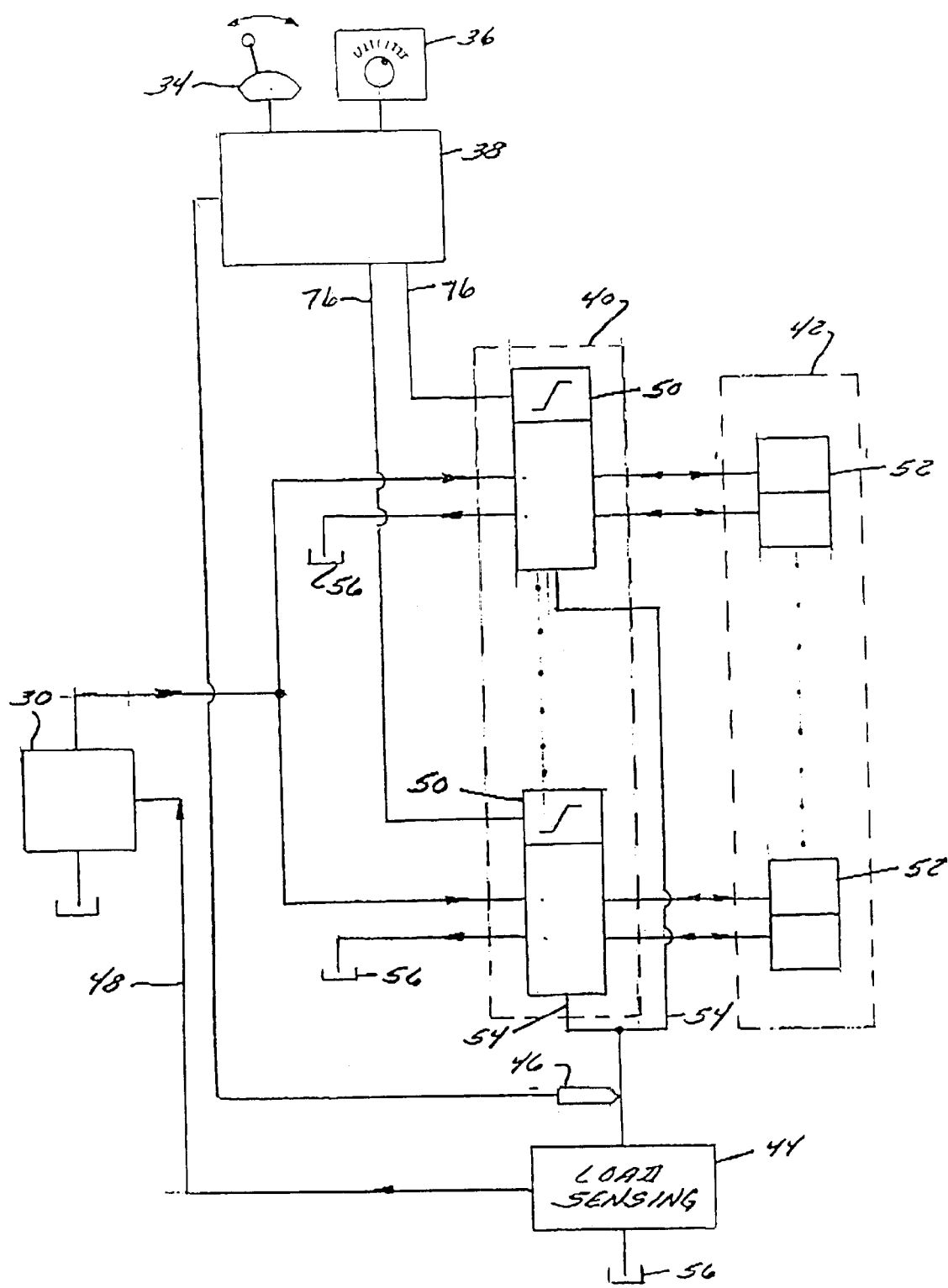
FIG. 2 is a top-level schematic diagram of an auxiliary hydraulic valve control and calibration system.

Referring now to FIG. 2, at least one proportional control lever or knob 34 and flow rate control 36 are coupled to electronic controller 38. A pressure sensor 46 is also coupled to controller 38 and provides a signal indicative of the pressure in load signal line 54. Controller 38 is electrically coupled to valves 40 and generates a valve signal indicative of the degree of desired valve opening for each of the valves. FIG. 2 shows two individual valves for ease of illustration. It should be understood that the system is not limited to any particular number of auxiliary hydraulic control valves. Controller 38 transmits a signal to valve actuators 50. These valve actuators typically include an electrical coil responsive to the current transmitted from controller 38 and open the valve proportional to the current flowing through the actuators. In this manner, controller 38 can selectively apply individual signals to each of the valves causing them separately and independently to open or close.

Each valve is connected to quick-connect couplings 52 located at manifolds 42. There are typically two hydraulic lines extending between each valve and the manifold. As shown by the arrows on the hydraulic lines extending between the valves and the couplings, bi-directional flow is provided in each hydraulic line and depending upon the position of the valve.

The hydraulic valves are also fluidly coupled to load sensing and control circuit 44. The circuit receives a signal from each of the valves that indicates the load placed on the valve on signal lines 54. The signal lines for each valve are combined and are provided to pump 30 on signal line 48. Pump 30, in turn, responds to the load on the valves provided on signal line 48 and regulates its specific displacement based on that load. In this manner, pump 30 need only put out as much pressurized hydraulic fluid as is required to feed each of the hydraulic valves. Each of hydraulic valves 40 are also connected to a hydraulic reservoir or tank 56 for receiving fluid returned from the implement (not shown) that is coupled to quick-connect couplings 52.

Figure 3:
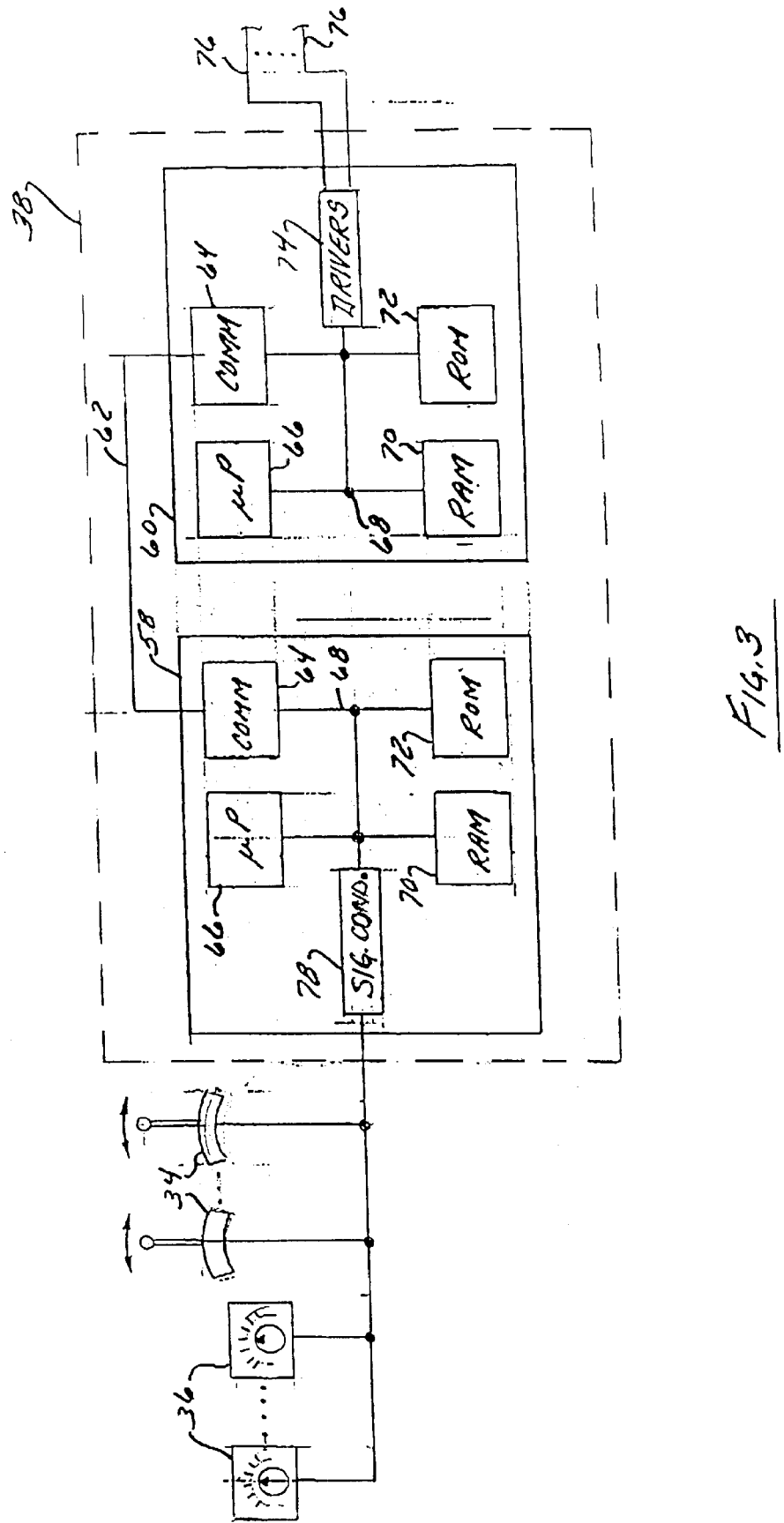
FIG. 3 is a detailed schematic of a microprocessor-based control system and operator controls for driving the auxiliary hydraulic valves.

Referring now to FIG. 3, a preferred arrangement of electronic controller 38 is shown having two separate microprocessor based controllers 58 and 60. While all of the functionality of the invention claimed herein could be provided by single microprocessor based controller, it is preferable to have several of them. Controllers 58 and 60 communicate over a serial communications link 62, typically configured to carry signals as packets of data in accordance with the SAE J1939 standard. Each controller 58 and 60 includes a communication circuit 64 which converts the packetized data on communications link 62 into a form useable by the microprocessor. Each of controllers 58 and 60 also includes a microprocessor 66 connected to circuits 64 over control/data/address bus 68. A random access memory (RAM) 70 is provided for each controller 58 and 60 and is also coupled to bus 68 to provide working memory for the microprocessors 66. A read only memory (ROM) 72 is also provided in each of controllers 58 and 60 to store the programmed instructions executed by microprocessors 66. Controller 60 includes a driver circuit 74 that is also coupled to bus 68 and responds to signals generated by microprocessor 66. Driver circuit 74 generates the signals on a plurality of signal lines 76 that are coupled to valve actuators 50. Controller 58 also includes a signal conditioning circuit 78 that is coupled to and conditions the signals received from proportional control lever 34 and flow rate control 36. Note that in this embodiment, more than one proportional control lever 34 and flow rate control 36 are coupled to controller 38. In a typical embodiment, one lever 34 and one control 36 is provided for each of the auxiliary hydraulic valves in the system. In operation, the operator moves a lever 34 to indicate a desired flow rate to one of valves 40. This signal, typically an electrical signal, is received by circuit 78 and is transmitted to microprocessor 66 in controller 58. Microprocessor 66 transmits the value over bus 68 to communications circuit 64 in controller 58. This circuit creates a digital packet including a numeric value indicative of the position of lever 34. Circuit 64 places this packet on serial communications link 62 and it is transmitted to a similar communications circuit 64 in controller 60. Circuit 64 in controller 60 extracts the numeric value from its packetized form and provides it to microprocessor 66 in controller 60. Microprocessor 66, in turn, generates a valve signal indicative of the desired flow rate through the valve corresponding to the lever that was moved and transmits that signal to driver circuit 74. Driver circuit 74, in turn, amplifies that signal and produces a valve signal which is applied on one of signal lines 76 to the appropriate valve actuator 50 (see FIG. 2). In this manner, electronic controller 38 responds to operator commands and generates an appropriate valve signal.

Once the system has been calibrated, and a value indicative of the dead-band of the valve has been saved in ROM 72, microprocessor 66 will add this as a calibration or offset value to the signal generated by lever 34. This signal, which is a composite of the operator's command and the calibration value, is then provided to driver circuit 74 and thence to actuator 50, as described above. The calibration value can be stored in any of the memory circuits on busses 68. In addition, the combining of the offset value and the command generated by lever 34 can be performed by either of the microprocessors. If the calibration value and the operator's command from lever 34 combined in controller 58, the combined value is packetized and sent over serial communications link 62 to controller 60.

Flow rate controls 36 also generate a signal proportional to the degree of deflection by the operator. In the present system, flow rate controls 36 may be a potentiometer which generates an electrical signal proportional to the degree of deflection of the potentiometer. It may also be an optical encoder that typically sends out pulses for each increment of deflection. In the case it is a digital device, such as a shaft encoder, controller 58 will add to (or subtract from) the pulses as they are received to determine how far the operator has moved the flow rate control. Alternatively, it could be a monolithic digital device incorporating a shaft encoder-like element that transmits a digital value that's magnitude is proportional to the degree of deflection. All such devices and similar ones for converting a deflection or rotation into a value indicative of the total degree of deflection are well-known in the art. The proportional control lever or knob is similarly constructed.

Figure 4:
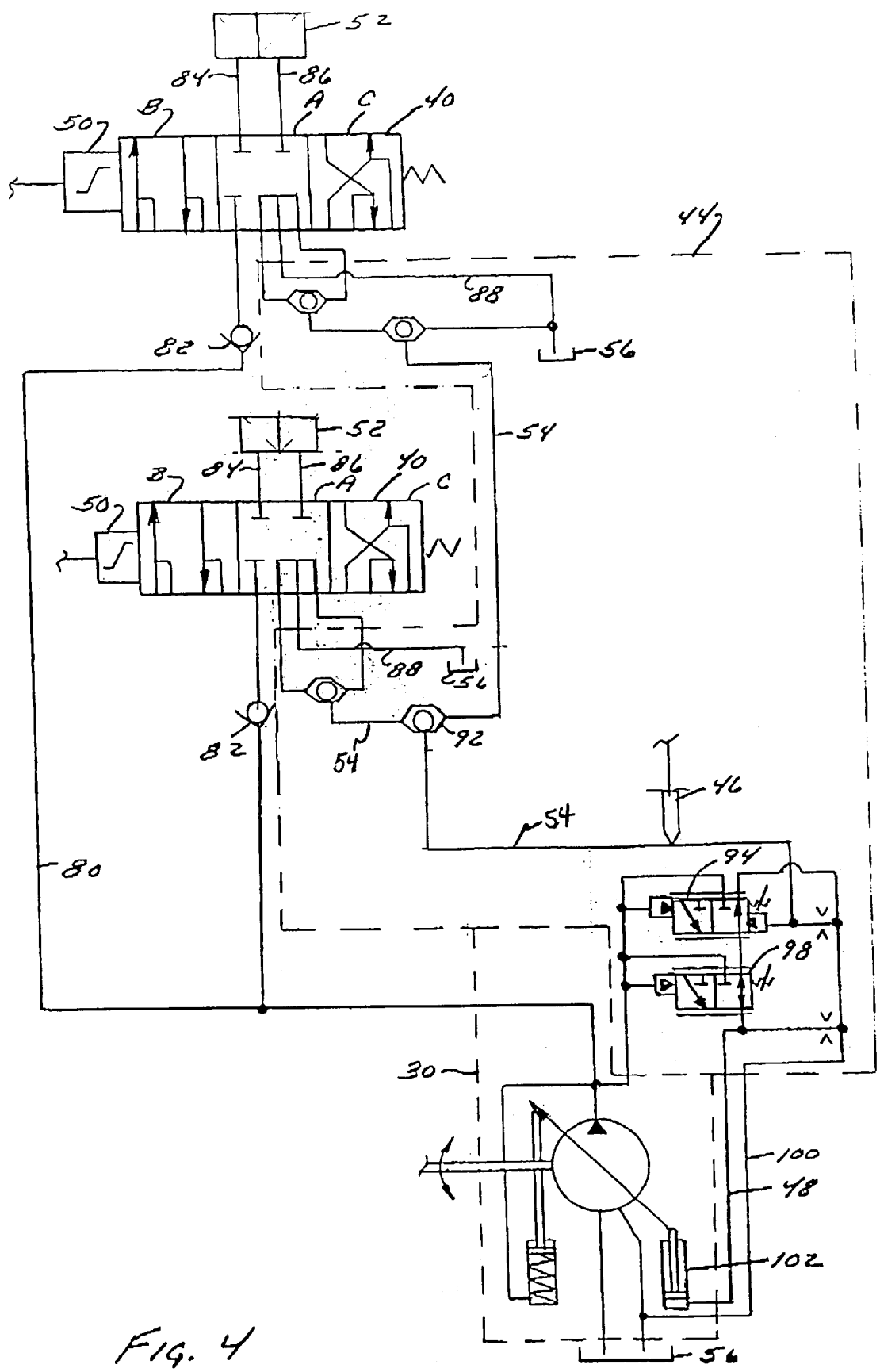
FIG. 4 is a detailed embodiment of a hydraulic pump and valve arrangement together with a load sensing and control circuit for regulating the specific displacement of the pump.

Referring now to FIG. 4, two hydraulic valves 40 are connected to a hydraulic fluid supply conduit 80, which supplies hydraulic fluid under pressure to the valves from hydraulic pump 30. Check valves 82 are disposed in a hydraulic supply conduit to prevent the back flow of hydraulic fluid from the valves to the pump. Depending upon the position of valves 40, fluid from the hydraulic pump is provided to conduits 84 or 86, which extend between valves 40 and quick-connect couplings 52 located in manifold 42.

Hydraulic fluid returning from the actuators coupled to couplings 52 is conducted to hydraulic tank or reservoir 56 through hydraulic conduits 88 that are coupled to and between tank 56 and valves 40. During calibration, actuators 50 cause the valve mechanism to shift from the closed position "A" to either of positions "B" or "C". Calibration can occur, and preferably does occur, with no device attached to couplings 52 and thus with no fluid flowing either to a loop-back tool or to an implement. Nonetheless, as valve 40 shifts, a flow path between conduit 80 and signal conduit 54 begins to open. Hydraulic fluid flows into conduit 54 as the valve is physically cracked and is applied to load sensing circuit 44. Signal conduit 54 is common to both of the valves 40 shown in FIG. 4. As each valve is separately cracked during calibration, they are joined together at bi-directional check valve 92 in such a manner that the cracking of either valve causes hydraulic fluid to flow into conduit 54 which is therefore common to both the illustrated valves. Although there are only two valves shown in FIG. 4, for convenience, any number of auxiliary valves can connected to a common load sensing circuit by a signal line 54.

The particular load sensing circuit 44 shown in FIG. 4 uses two valves to control the specific output of pump 30: valves 94 and 98. As one or the other (or both) of valves 40 are cracked, pressure is applied to signal line 54 and is communicated to valve 94. This signal line pressure is applied to the valve causing it to shift toward the position shown in FIG. 4. As a result, signal line 48 is connected through valves 98 and 94 to tank 56 via conduit 100. This causes piston and cylinder arrangement 102 to change its position as fluid travels from arrangement 102 to tank 56 through valves 94 and 98. Arrangement 102 is coupled to the other components of pump 30 to vary the specific output of the pump.

Sensor 46 is coupled to signal line 54 and detects hydraulic fluid pressure fluctuations in that signal line. It is a fluid node common to both (all) of valves 40 due to the construction of signal line 54 and thus can be used to measure the cracking open of each of the valves 40. As a result, when a valve 40 being calibrated just cracks open, hydraulic fluid will flow from conduit 80 into that valve, then out of that valve on signal line 54 to load sensing circuit 44. This causes a pressure fluctuation on signal line 54, which is, in turn, detected by pressure transducer 46. A pressure fluctuation measured at transducer 46 is therefore indicative of any of valves 40 just cracking open. Note that this sensing of actual valve opening is independent of any flow through quick-connect couplings 52. In this manner, pressure transducer 46 and controller 38 can sense actual valve opening regardless of any flow or lack thereof through couplings 52. This permits the elimination of a separate loop-back testing tool that might otherwise be required to be connected to couplings 52.

Figure 5:
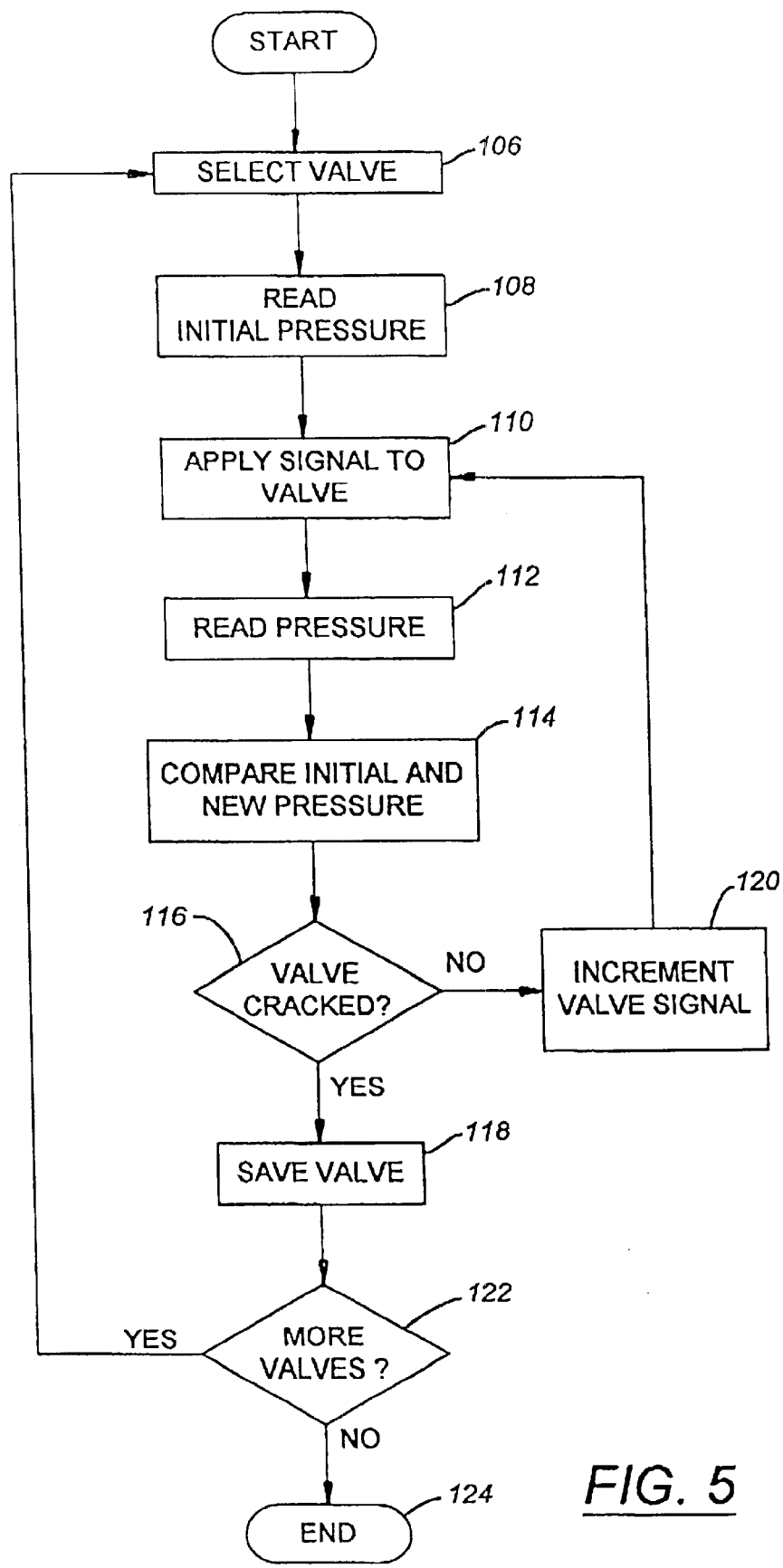
FIG. 5 is a flow chart showing the mode of operation of the system when calibrating each of the auxiliary hydraulic valves.

In FIG. 5, a flow chart of the calibration process performed by controller 38 is illustrated. In the first step, Step 106, controller 38 selects a valve to be calibrated. Controller 38 then reads the initial pressure at transducer 46 indicative of pressure on a load sensing signal line. This value is saved and is used as reference in future calibration calculations for that valve.

In Step 110, controller 38 applies an initial small signal to the valve that was selected for testing in Step 106. Once the signal is applied, controller 38 reads the pressure at pressure sensor 46 in Step 112 to determine whether the pressure has changed. The pressure measured in Step 112 is compared with the initial pressure measured in Step 108 in Step 114. If the pressure has changed sufficiently, as shown in Step 116, controller 38 saves a value indicative of the signal applied to actuator 50 in Step 118. The selected valve is now calibrated.

On the other hand, if the controller's comparison of the two pressures does not indicate that the valve is cracked open, controller 38 increments the signal applied to the valve in Step 120 and processing returns to Step 110. With this incremented valve signal, controller 38 again reads the pressure in Step 112 and compares the initial pressure with the new pressure in step 114. This process of incrementing the valve signal, (the signal applied to the valve actuators 50), is repeated until controller 38 determines that a sufficient difference between the initial or reference pressure and the newly measure pressure at transducer 46 exists. At which point, a value indicative of the signal applied to actuator 50 that was just sufficient to crack the valve is saved in Step 118, as described above.

Once one valve has been calculated, controller 38 then determines if there are more valves to be calculated in Step 122. If there are, processing returns to Step 106 and the new valve is selected. The pressure is incremented until this new valve cracks as described in the paragraphs above.

Controller 38 again checks whether there are additional valves in Step 122, and if there are, it again repeats the calibration process of the Steps 106 through 118.

Ultimately, all the auxiliary hydraulic valves in the system will be calibrated and the answer to the question in block 122 will be "no". At this point, the calibration process ends at block 124.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A computer calibration method for calibrating a plurality of auxiliary hydraulic proportional control valves in a bi-directional flow control circuit in a work vehicle, wherein the inlet of each of the plurality of valves is provided with pressurized hydraulic fluid from a common source and wherein the outlet of each of the plurality of valves is fluidly coupled to a common load sensing circuit and is also configured to be fluidly coupled to an implement, and further wherein the load sensing circuit is fluidly coupled to the common source to control the specific hydraulic fluid output of the common source, and further wherein all of the plurality of valves are driven by an electronic controller that is configured to generate an electrical signal proportional to a desired degree of opening of each of the plurality of valves, the computer method comprising the steps of:
   (a) selecting a first valve of the plurality of valves;
   (b) applying a signal to the first valve equivalent to a first degree of desired valve opening;
   (c) measuring a first pressure in the load control circuit;
   (d) comparing the first pressure with a predetermined pressure to identify a change in pressure indicative of the first valve opening;
   (e) incrementing the signal to a second desired degree of valve opening greater than the first degree of valve opening if the step of comparing does not indicate that the first valve has opened;
   (f) repeating steps (b)–(e) until the first valve opens;
   (g) saving a value indicative of the signal.

2. The method of claim 1, further comprising the step of:
   (h) automatically repeating steps (a)–(g) for a second valve of the plurality of valves instead of a first valve.

3. The method of claim 2, wherein all the steps are performed automatically under computer control.

4. The method of claim 3, wherein the step of measuring a first pressure includes the step of measuring a pressure indicative of a hydraulic pressure in the load sensing circuit.

5. The method of claim 4, wherein the step of measuring a first pressure includes the step of measuring a pressure at a pressure monitoring point common to the plurality of valves.

6. The method of claim 5, further including the steps of:
   measuring a preliminary pressure in the load control circuit; and
   saving the preliminary pressure for later use as the predetermined pressure in step (d).

7. An auxiliary hydraulics system for a work vehicle, comprising:
   a plurality of auxiliary hydraulic proportional control valve assemblies;
   a common load sensing circuit coupled to the plurality of valve assemblies and configured to generate a load control signal indicative of a composite hydraulic load;
   a common hydraulic source coupled to each of the plurality of valve assemblies and having a variable specific hydraulic fluid output;
   at least one microprocessor configured to generate a valve opening signal and to selectively apply the valve opening signal to each of the plurality of valve assemblies wherein the at least one microprocessor is further configured to
   (a) select a first valve of the plurality of valve assemblies;
   (b) apply a signal to the first valve equivalent to a first degree of desired valve opening;
   (c) measure a first pressure in the load sensing circuit;
   (d) compare the first pressure with a predetermined pressure to identify a change in pressure indicative of the first valve opening;
   (e) increment the signal to a second desired degree of valve opening greater than the first degree of valve opening if the step of comparing does not indicate that the first valve has opened;
   (f) repeat steps (b)–(e) until the first valve opens; and then
   (g) save a value indicative of the signal.

8. The system of claim 7, wherein the microprocessor is further configured to:
   (h) automatically repeat steps (a)–(g) for a second valve of the plurality of valves other than the first valve.

9. The system of claim 8, further comprising a hydraulic fluid pressure sensor coupled to the load sensing circuit that is also coupled to the microprocessor and at which the microprocessor measures the first pressure.

10. The system of claim 9, wherein the load sensing circuit includes a fluid node that is common to all of the plurality of valves and to which the pressure sensor is fluidly coupled.

* * * * *